United States Patent [19]
Niebauer

[11] Patent Number: 5,116,167
[45] Date of Patent: May 26, 1992

[54] CUTTING INSERT WITH CHIP CONTROL

[75] Inventor: Kenneth L. Niebauer, Raleigh, N.C.

[73] Assignee: Kennametal Inc., Latrobe, Pa.

[21] Appl. No.: 657,483

[22] Filed: Feb. 19, 1991

[51] Int. Cl.⁵ .................... B23B 27/16; B23B 27/22
[52] U.S. Cl. ................................. 407/114; 407/116
[58] Field of Search .................. 407/113, 114–116

[56] References Cited

U.S. PATENT DOCUMENTS

| | | | |
|---|---|---|---|
| D. 305,662 | 1/1990 | Niebauer | 407/114 X |
| 3,733,664 | 5/1973 | McKelvey | 407/114 |
| 4,035,541 | 7/1977 | Smith et al. | 428/217 |
| 4,056,871 | 11/1971 | Bator | 407/114 |
| 4,087,192 | 5/1978 | Hertel | 407/114 |
| 4,318,645 | 3/1982 | McCreery | 407/114 |
| 4,340,324 | 7/1982 | McCreery | 407/114 |
| 4,344,725 | 8/1982 | Seidel | 407/114 |
| 4,447,175 | 5/1984 | Warren | 407/114 |
| 4,507,024 | 3/1985 | Stashko | 407/114 |
| 4,610,931 | 9/1986 | Nemeth et al. | 428/547 |
| 4,846,609 | 7/1989 | Bernadic et al. | 407/114 |
| 4,915,548 | 4/1990 | Fouquer et al. | 407/114 |
| 4,934,879 | 6/1990 | van Barneveld | 407/66 |
| 4,959,331 | 9/1990 | Mehrotra et al. | 501/89 |
| 4,959,332 | 9/1990 | Mehrotra et al. | 501/89 |
| 4,963,061 | 10/1990 | Kathi et al. | 407/114 |
| 4,984,940 | 1/1991 | Bryant et al. | 407/119 |
| 5,044,840 | 9/1991 | Fouquer et al. | 407/115 X |

FOREIGN PATENT DOCUMENTS 0362171 4/1990 European Pat. Off. .
0364421 4/1990 European Pat. Off. .

OTHER PUBLICATIONS

Kennametal, New KC990 Advertisement, Pub. No. A89-45(25)C9.
Kennemetal, Kennametal/85 Catalog, Technical Data Section 9, pp. 283–291, Pub. No. A84-18(140)J4.
Kennametal, Chip Control Inserts Advertisement, Pub. No. MM8507.
Sumitomo Electric brochure "Sumitomo AC15 Ceramic Coated Inserts," (available at trade show in Sep., 1990.) p. 3.
Sumitomo Electric brochure "Sun Bumpy Insert EMU Series," (available at trade show in Sep., 1990.).

Primary Examiner—Steven C. Bishop
Attorney, Agent, or Firm—James G. Porcelli

[57] ABSTRACT

An indexable cutting insert is shown capable of cutting operations over a wide range of parameters such as depth of cut or feed rate. The insert has different geometries at certain locations on the cutting surface such that under differing parameters a desirable cutting surface will be in contact with the workpiece.

20 Claims, 7 Drawing Sheets

CUTTING INSERT WITH CHIP CONTROL

CROSS REFERENCE TO RELATED APPLICATIONS

This application is related to copending U.S. patent application Ser. No. 07/659,482 entitled "Cutting Insert with Chip Control" by Kenneth L. Niebauer filed Feb. 19, 1991.

BACKGROUND OF THE INVENTION

The present invention relates to cutting tools and, in particular, to an indexable cutting insert having a chip control geometry providing chip control over a wide range of parameters such as depth of cut or feed rate.

With the current selection of cutting insert geometries, it is necessary, when the depth of cut or the feed rate is significantly altered, to change the cutting insert to one having the desired geometry most effective for the specific parameters. This process not only requires changing cutting inserts to satisfy the cutting parameters, but also necessitates maintaining an inventory of various cutting inserts such that the desired insert geometry is available when needed.

It is, therefore, an object of this invention to provide a cutting insert that may effectively be utilized over a variety of parameters and through this versatility reduce the frequency of changing inserts and reduce the need for a large variety of different insert geometries.

It is a further object of this invention to provide a chip control geometry such that effective chip control is maintained over the range of parameters for which the cutting insert is utilized.

BRIEF SUMMARY OF THE INVENTION

An indexable cutting insert is provided having a polygonal body of wear resistant material with top and bottom surfaces and therebetween a peripheral wall with sides and rounded corners. At the intersection of the peripheral wall and the top surface is a cutting edge. The top surface comprises a land area joining the cutting edge and extending inwardly toward the center of the body. The land area is comprised of corner portion land areas and side portion land areas. The top surface also comprises a floor between the land area and the center of the body, which is disposed at a lower elevation than the land area. The top surface further comprises sloping wall portions inclined downwardly and inwardly from the land area to the floor. Finally the top surface comprises corner portions disposed at respective corners of the body and positioned about a bisector line. A plateau may be disposed upon the floor spaced apart from the sloping wall portions and having sloped sides ascending from the floor and extending toward the corner portions.

In one embodiment each corner portions is embedded in and protrudes from the corner portion land area such that the land area extends inwardly to a lesser amount than the adjacent side portion land area, thereby providing a land area of lesser width in the corner portions.

In another embodiment each corner portion is spaced apart from the corner portion land area and extends from the adjacent sloping wall portions, thereby providing a land area of uniform width in the corner portions.

Within each of these embodiments may be introduced protuberances associated with each corner portion positioned about a bisection line at a location between the plateau and the sloping wall portions.

In yet another embodiment the plateau is extended to the corner portions and elevated to a height above the cutting edge and land area. In this manner both the top surface and the bottom surface of the insert may be utilized as cutting surfaces.

Within each of these embodiments may be introduced projections having wave-like elements disposed on the sloping wall portions.

BRIEF DESCRIPTION OF THE DRAWING

The exact nature of the present invention will become more clearly apparent upon reference to the following detailed specification taken in connection with the accompanying drawings in which.

DETAILED DESCRIPTION OF THE INVENTION

Figure 1:
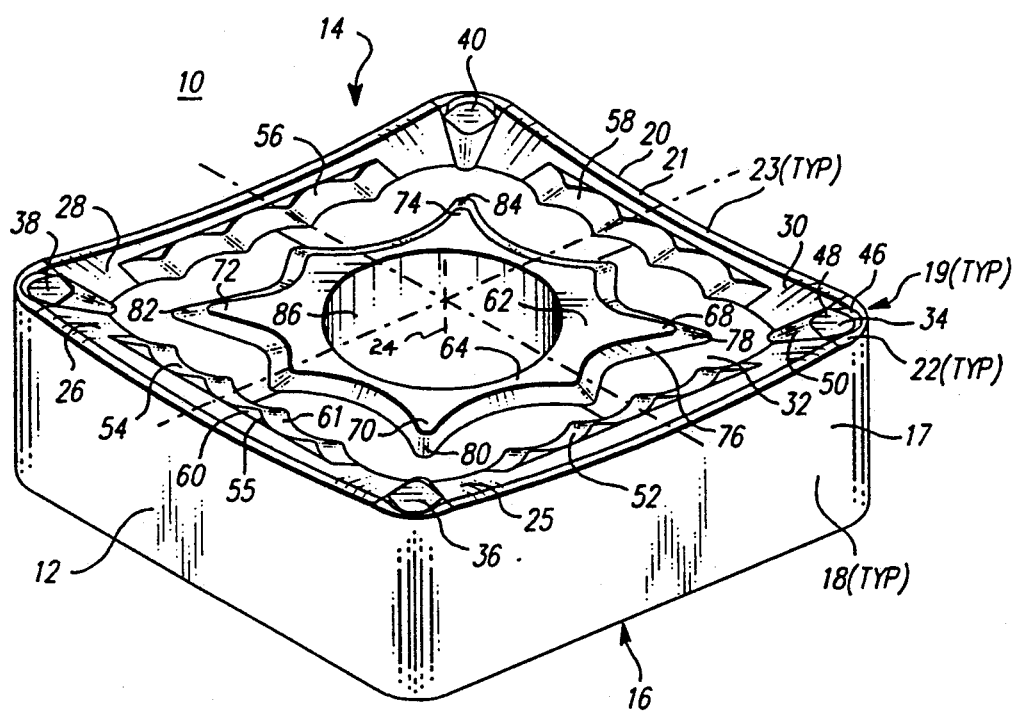
FIG. 1 is an isometric view showing one embodiment of a cutting insert according to the invention.

FIGS. 1-6 show one embodiment of the invention. FIG. 1 shows an isometric of a generally polygonal indexable cutting insert 10. The insert 10 has a polygonal body 12 of wear resistant material. The body includes a top surface 14 and a bottom surface 16 and therebetween a peripheral wall 17 having sides 18 and rounded corners 19. A cutting edge 20 is formed at the intersection of the top surface 14 and the peripheral wall 17.

For the purposes of this discussion an insert geometry identified as an 80 degree diamond, which is a rhombic configuration having two 80 degree corners and two 100 degree corners, will be presented. However, it should be realized that the configuration of this invention should not be limited to an 80 degree diamond and that other geometric shapes may be substituted. Among the shapes may be other rhombic configurations such as squares, a 55 degree diamond (which has two 55 degree corners and two 125 degree corners), a triangle, or a trigon.

The cutting insert should be manufactured of a wear-resistant material. Refractory coated cemented carbide materials, such as KC850®, KC950® or KC990® may be used. Ceramic materials, such as KYON® 4000, may also be used.

KC850® is a trademark of Kennametal Inc., representing a coated carbide grade having a TiC/TiCN/TiN coating over a substrate. An outer layer of the C porosity carbide substrate is enriched with cobalt. Further details of the coating arrangement are available in U.S. Pat. No. 4,035,541, entitled "Sintered Cemented Carbide Body Coated with Three Layers," by Smith et al., issued Jul. 12, 1977, and assigned to the assignee herein.

KC950® is a trademark of Kennametal Inc., representing a ceramic-coated carbide grade of a TiC/Al$_2$O$_3$/TiN coating over a substrate. An outer layer of the carbide substrate is cobalt enriched. Further details regarding this material are available in U.S. Pat. No. 4,610,931, entitled "Preferentially Binder Enriched Cemented Carbide Bodies and Method of Manufacture," by Nemeth et al., issued Sep. 9, 1986, and assigned to the assignee herein. Details of both KC850® and KC950® are further discussed in the Kennametal advertisement, entitled "Chip Control Inserts," published in 1985 as publication number MM8507.

KC990® is a trademark of Kennametal Inc., representing a multilayered coated carbide grade having a TiCN/Al$_2$O$_3$/TiN coating over a substrate. Details of the composition of this material are available in U.S. Pat. No. 4,984,940, entitled "Multilayer Coated Cemented Carbide Cutting Insert," by Bryant et al., issued Jan. 15, 1991, and assigned to the assignee herein. KC990® is further described, along with applications for cutting inserts made of KC950® and KC990®, in the Kennametal advertisement entitled "New KC990 multi-coated grade . . . so advanced it'll take your productivity beyond the next decade," published in 1989 as publication number A89-45(25)C9.

Pages 284 through 291 of the Kennametal catalog, entitled "Kennametal/85 Metalcutting tools for greater productivity," published in 1984 as publication number A84-18(140)J4 provide further details of KC850® and KC950®, including applications for cutting inserts made of these materials.

KYON® 4000 is a trademark of Kennametal Inc., representing a material of ceramic composition containing about 1.5% silicon carbide whiskers, about 10% zirconia, of which at least about 60 to 70% is in the form of tetragonal zirconia, and with or without minor amounts (e.g. about 0.55%) of magnesia additions, and all dispersed in an alumina matrix. Further information about KYON® 4000 type cutting inserts can be found in U.S. Pat. Nos. 4,959,331 and 4,959,332 and U.S. patent application Ser. No. 629,760, by inventors Beeghly et al., filed on Dec. 18, 1990, and assigned to the assignee herein.

All of the U.S. patents and the publications cited above are hereby incorporated by reference into this document.

Returning to FIG. 1, a cutting edge land area 21 extends inwardly from the cutting edge 20 toward the center of the body 12. The land area is comprised of corner portion land areas 22 and side portion land areas 23. Sloping wall portions 25, 26, 28 and 30 extend from the land area 21 downwardly and inwardly to a floor 32. The floor 32 is disposed at a lower elevation than the land area 21.

Corner portions 34, 36, 38 and 40 are disposed at respective corners of the body 12. These corner portions 34, 38 and 36, 40 are disposed about bisector lines 42 and 44 (FIG. 2), respectively. The bisector lines each bisect an angle formed by the intersection of a line extended from the cutting edge 20 along each adjacent side 18 at the respective corner portion. While there are actually four bisector lines, one each for the corner portions 34, 36, 38 and 40, because of the shape of the insert 10 shown in FIGS. 1 and 2, two bisector lines are common to bisector line 42 and two are common to bisector line 44.

Figure 2:
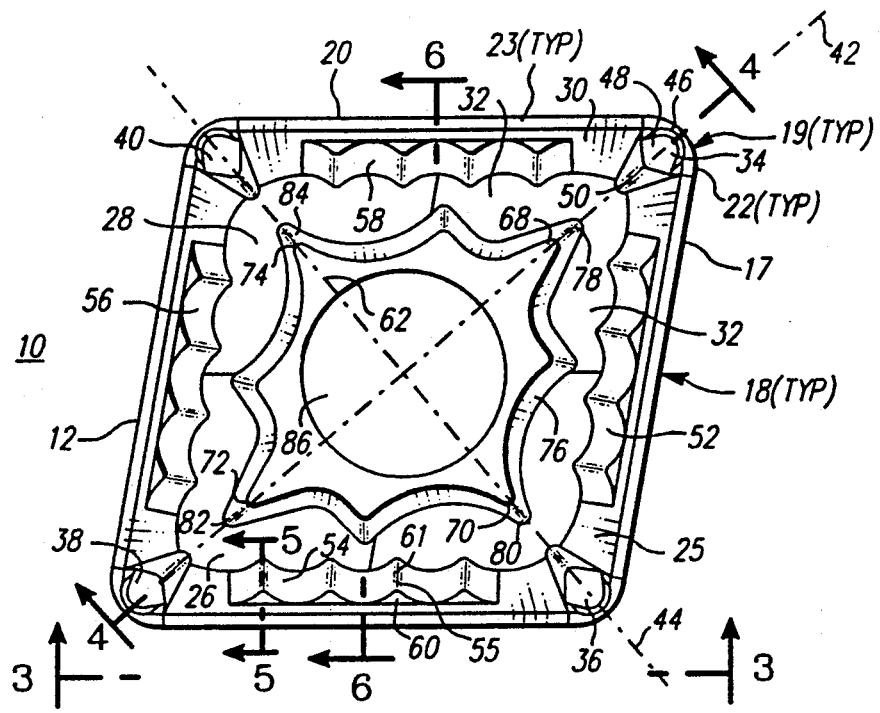
FIG. 2 is a top view of the cutting insert shown in FIG. 1.

In one embodiment of the invention, each corner portion 34, 36, 38 and 40 protrudes into the respective corner portion land area 22 such that the corner portion land area 22 extends inwardly to a lesser amount than the adjacent side portion land area 23. The width of the corner portion land area 22 decreases to a minimum width at the respective bisector line. This is shown in FIGS. 1 and 2.

In a second embodiment the corner portion land area 22 in the corner portions 34, 36, 38 and 40 is of uniform width. This will be discussed with FIG. 12.

At this point, the corner portions 34, 36, 38 and 40 will be described in detail. However, for simplicity and clarity, only details of corner portion 34 will be presented. It should be understood that the remaining corner portions 36, 38 and 40, while oriented differently, are similar to that corner portion 34. Focusing on corner portion 34 in FIG. 1, upper descending wall 46 extends from the corner portion land area 22 to a recessed planar area 48 at an elevation below the land area 21. A lower descending wall 50 extends from the recessed planar area 48 to the floor 32. The shape of the upper descending wall 46 may be concave and the shape of the lower descending wall 50 may be convex.

As illustrated, the upper descending wall 46 is disposed within the corner portion land area 22 and, as such, the corner portion land area 22 in the corner portion 34 is of a smaller width than the adjacent side portion land areas 23. Furthermore, as a result of this, the included angle defined by the intersection of imaginary lines extending from the two sides of the cutting edge 20 adjacent to the corner portion 34 is greater than that included angle defined by those straight portions formed at the intersection of the upper descending wall 46 and the recessed planar area 48.

Projections 52, 54, 56 and 58 may be disposed upon sloping wall portions 25, 26, 28 and 30, respectively and between adjacent pairs of corner portions. Again for simplicity and clarity, only details of projection 54 will be described with the understanding that projections 52, 56 and 58 are similar. Projection 54, disposed upon sloping wall portion 26, is comprised of at least one wave-like element 55 which extends downwardly and inwardly to the floor 32. The wave-like element 55 comprises a planar upper surface 60 located at an elevation below the land area 21 extending toward the center 24 of the body 12. The surface 60 intersects with a sloped face 61 which extends downward and toward the center 24 where it meets with the floor 32. The projection 54 is spaced from the corner portions 36 and 38 to define a chip-curling zone between the corner portion 36 and the projection 54 and between the corner portion 38 and the projection 54. Note that element 55 may be one of a number of elements of the projection 54 and, as such, more than one element 55 may be desirable within projection 54 as illustrated in the FIG. 1.

In addition to the structure of FIG. 1 just described, a plateau 62 may be disposed upon the floor 32. In FIG. 1, the plateau 62 is spaced apart from the sloping wall portions 25, 26, 28 and 30, and the projections 52, 54, 56 and 58 by the floor 32. The plateau 62 has a top surface 64 with a periphery 66 which comprises corner curves 68, 70, 72 and 74 which act to define the shape of the adjacent sloped side 76. Each corner curve 68, 70, 72 and 74 is positioned near a corner portion 34, 36, 38 and 40, respectively, and is bisected by a bisector line 42, 44 (FIG. 2), such that a convex ascending surface 78, 80, 82 and 84 to the top 64 of the plateau 62 is formed and aligned with each respective corner portion 34, 36, 38 and 40.

A circular opening 86 extending from the top surface 14 through the bottom surface 16 of the body 12 is provided in order to permit securing the cutting insert 10 to a toolholder for use in machining operations.

Further details of FIG. 1 are presented in FIGS. 2-6. FIG. 2 represents a top view of the cutting insert shown in FIG. 1. Item numbers for previously discussed portions of the cutting insert are included in FIG. 2.

Figure 3:
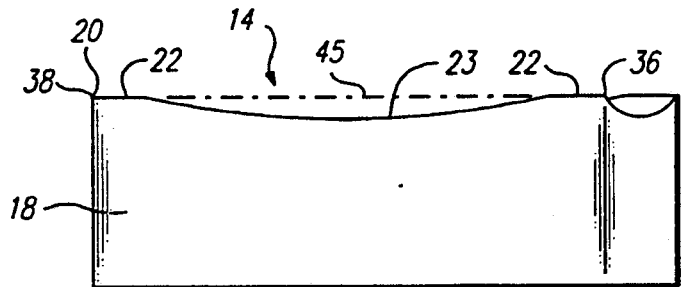
FIG. 3 is a side view of the cutting insert along arrows "3—3" in FIG. 2.

FIG. 3, a view from the side of the cutting insert shown in FIG. 2, illustrates the corner portion land area 22 and shows the curvature of the side portion 23 along the side 18. Corner portions 36 and 38 are shown for reference. It should be noted that the plateau 62 (FIGS. 1 and 2) is not visible in FIG. 3 because the plateau is below the level of the side portion land area 23. For these reasons, the insert embodiment shown in FIG. 1 may be used only as a single-sided insert.

Figure 7:
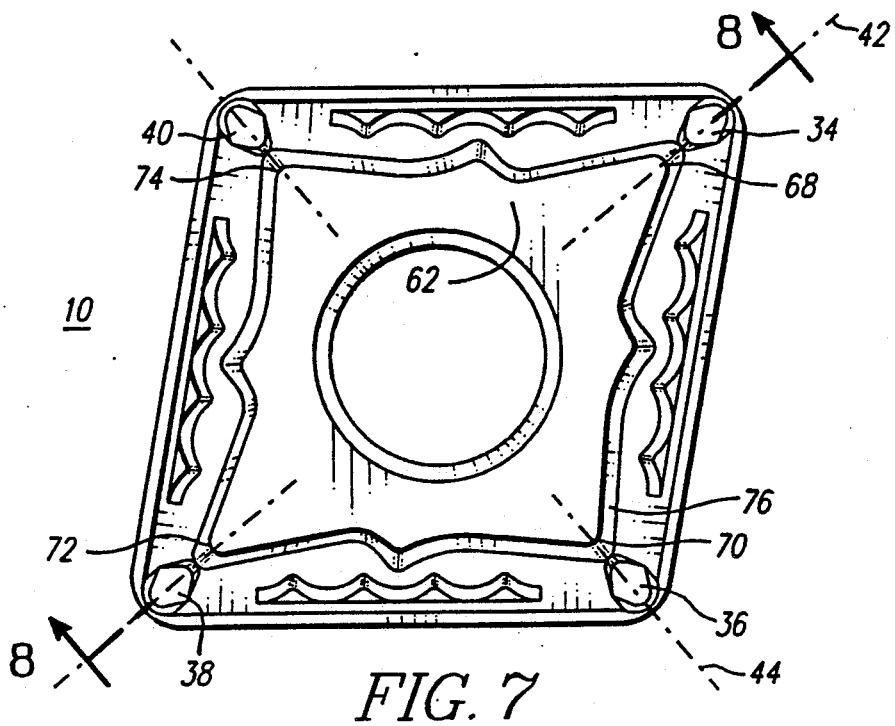
FIG. 7 is a top view of an insert showing an alternative embodiment of the invention similar to the embodiment illustrated in FIGS. 1-6 but with the plateau extended to contact the corner portions of the insert.
Figure 8:
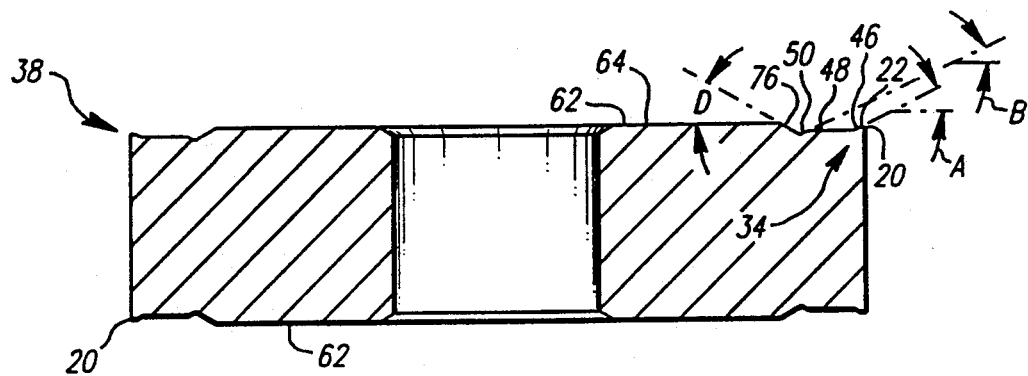
FIG. 8 is a cross-sectional view of the insert shown in FIG. 7 viewed along arrows "8—8".

In the alternative and as will be shown in FIGS. 7 and 8, the plateau 62 could be raised to a level above the corner portion land area 22 and the side portion land area 23. In such an instance the bottom surface 16 could be formed to resemble the top surface and the cutting insert could then be invertible and function as a double-sided insert. However, in order to exploit this feature, it would be necessary to have details identical to those shown in the top surface 14 of FIG. 1 on the bottom surface 16 of FIG. 1. Furthermore, the plateau 62 would be extended to provide greater surface area for structural support to the insert 10.

A reference plane 45, shown in FIG. 3, may be defined by a plane intersecting the corner portion land areas 22 at the cutting edge 20 of the body 12. Such a plane will be referenced frequently to identify angles of the insert 10.

Figure 4:
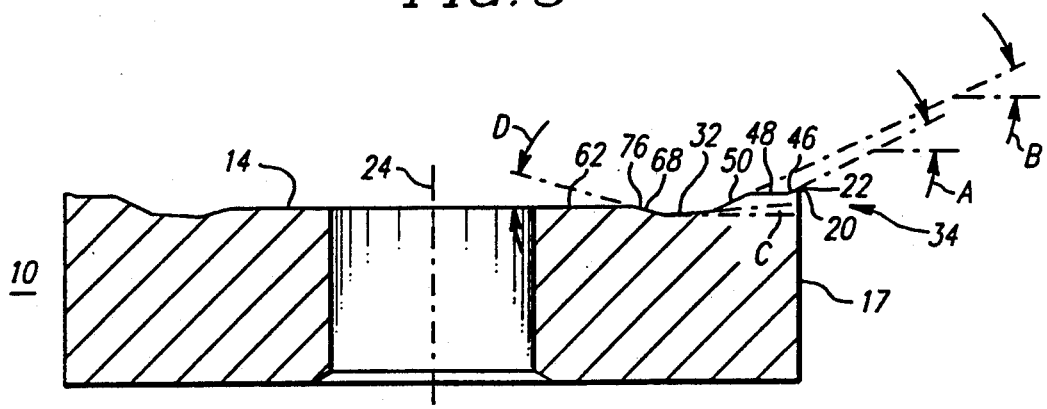
FIG. 4 is a cross-sectional view of the cutting insert viewed along a bisector line shown by arrows "4—4" in FIG. 2.

FIG. 4 illustrates a cross-section view bisecting the cutting insert 10 along arrow "4—4" which is bisector line 42. As such, this is a cross-section through corner portions 34 and 38, shown in FIG. 2. The top surface 14 of the cutting insert 10 intersects the peripheral wall 17 to form the cutting edge 20. The corner portion land area 22 extends from the cutting edge 20 toward the center 24 of the insert 10. Within corner portion 34, the upper descending wall 46 extends from the corner portion land area 22 to the recessed planar area 48.

While the surface of the corner portion land area 22 may be parallel to the reference plane 45 (FIG. 3) in a direction toward the center 24 of the insert and as such have what is known as a neutral rake angle, the corner portion land area 22 may also form a different angle with the reference plane and have a positive or negative rake angle. This angle may vary up to about a 10 degree deviation in either direction from the neutral rake angle.

Returning to FIG. 4, the angle A that the upper descending wall 46 forms with the reference plane is between 18 and 30 degrees, preferably 26 degrees. The recessed planar area 48 extends toward the center 24 of the insert 10 and intersects with the lower descending wall 50 which descends inwardly to the floor 32. The lower descending wall 50 forms an angle B with the reference plane of between about 25 to 30 degrees. The floor 32 extends toward the center 24 of the insert 10 and intersects with the sloped side 76 of the plateau 62. The floor 32 may form an angle C with the reference plane of approximately 4 degrees. The angle D that the sloped side 76 forms with the reference plane at the corner curve 68 of the plateau 62 is between 15 and 30 degrees, preferably 16 degrees. In the embodiment shown in FIGS. 1-6, the floor 32 can be seen to be in four segments. However if the angle C were to be 0 degrees, then the floor could be planar and as such a single segment.

Figure 5:
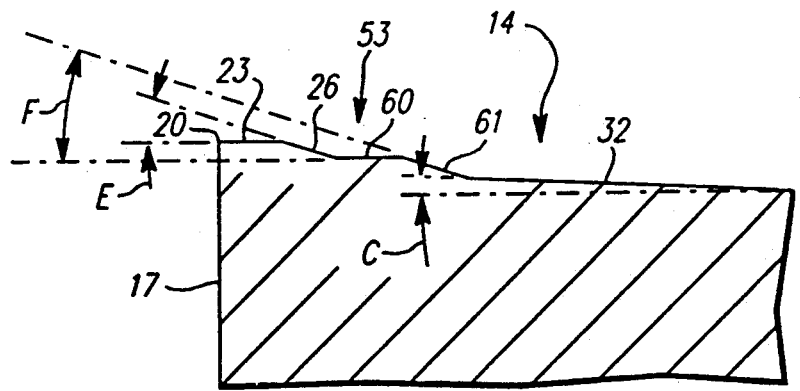
FIG. 5 is a cross-sectional view of a portion of the insert viewed along arrows "5—5" in FIG. 2.

In order to provide details of the projections 52, 54, 56 and 58 and the associated wave-like elements 53, 55, 57 and 59 respectively, FIG. 5 shows a cross-section along arrows "5—5" shown in FIG. 2 which reveals details of wave-like element 55 associated with projection 54. Just as before, the top surface 14 intersects with the peripheral wall 17 to form cutting edge 20. The side portion land area 23 extends inwardly to the sloping wall portion 26 which extends downwardly and inwardly toward the floor 32. The angle E with which the sloping wall portion 26 forms with the reference plane 45 is approximately 18 degrees. With the wave-like element 53 of projection disposed upon the sloping wall portion 26, the planar upper surface 60 of the element 53 extends from the sloping wall portion 26 inwardly toward the center (not shown) of the insert to a sloped face 61. The sloped face 61 then extends inwardly and downwardly toward the floor 32. The angle F the sloped face 61 forms with the reference plane is between 15 and 25 degrees, preferably 18 degrees. The sloped face 61 continues until it intersects with the floor 32.

Figure 6:
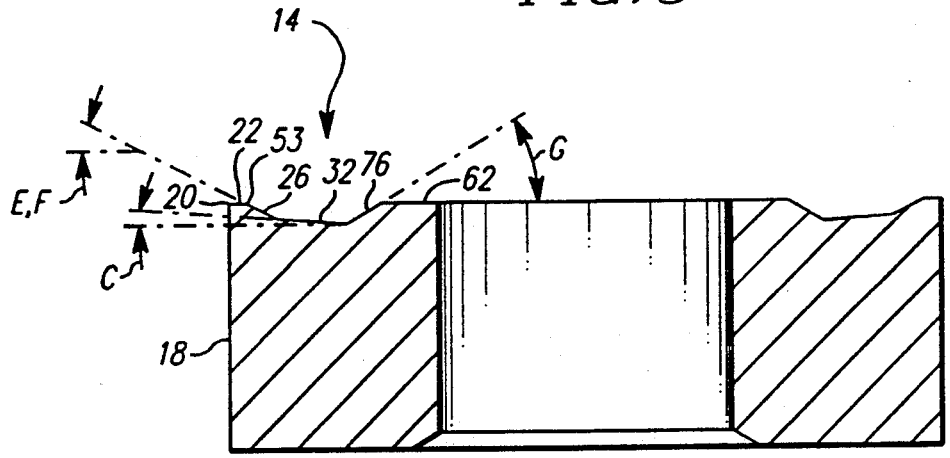
FIG. 6 is a cross-sectional view of the insert viewed along arrows "6—6" in FIG. 2.

FIG. 6 is a cross-section of the insert 10 along arrows "6—6" in FIG. 2. The details of FIG. 6 resemble those found in FIG. 5 except as will be discussed. Specifically, since FIG. 6 is taken along a line at which the wave-like element 53 of the projection 52 is essentially flush with the sloping wall portion 26, then, as can be seen in FIGS. 1 and 6, the sloping wall portion 26 and the element 53 provide a continuous surface. However, this is only true because angle E is equal to angle F in the figures. If angle E, which is approximately 18 degrees, and angle F, which may have a range between 15 and 25 degrees, are not identical, then there would be a discontinuity (not shown) between the sloping wall portion 26 and the sloped face 61. The angle G formed between the sloped side 76 and the reference plane along arrows "6—6" may be approximately between 15 and 35 degrees.

FIG. 7 shows an alternative embodiment of the invention. Modifications to the plateau 62 may be made by modifying the periphery such that the corner curves 68, 70, 72 and 74 are extended and the plateau 62 intersects with the respective corner portions 34, 36, 38 and 40 of the cutting insert 10. The corner portions 34, 36, 38 and 40 may again be disposed about bisector lines 42 and 44. While the other details are similar to those shown in FIGS. 1-6, the plateau 62 has now been modified such that each corner curve 68, 70, 72 and 74 has been extended so that the sloped side 76 of the plateau 62, at each corner curve, intersects with the respective corner portions 34, 36, 38 and 40.

While this modification may be incorporated into the embodiment shown in FIGS. 1-6, it should be noted that this embodiment provides an additional benefit—the opportunity to utilize both sides of the insert for cutting. FIG. 3 shows a single-sided insert having a bottom surface 16 for structural support and a top surface 14 with a side portion land area 23 that is curved along the side 18 the insert 10. As mentioned earlier the plateau 62 of the insert is at a level lower that of the land area 21 and the cutting edge 20. With such a configuration it would be impossible to have a double sided insert because in the inverted position the support provided would be only at the corners and this would be insufficient. A double-sided insert could be made if the insert had adequate structural support on each side to support the insert without creating excessive stresses. To this end, FIGS. 7 and 8 show a double sided insert in which the plateau has not only been extended toward the corner portions 34, 36, 38 and 40 but has also been raised above the cutting edge 20 and the land area 21. In doing so the insert may be supported on the face of the plateau 62 while the opposite side of the insert is used for metal cutting. With the extended plateau 62, the unsupported distance between the plateau 62 and the corner portions 34, 36, 38 and 40 is minimized.

FIG. 8 shows a cross-section view of a bisection of the insert along arrows "8—8" of FIG. 7 and illustrates that the plateau 62 extends to and intersects with the corner portion 34. The corner portion land area 22 extends from the cutting edge 20 to the upper descending wall 46 of the corner portion 34. From the upper descending wall 46, the recessed planar area 48 extends to the lower descending wall 50. However the lower descending wall 50 now intersects with the sloped side 76 of the plateau 62, which has been extended to the corner portion 34.

Because of this, the floor, while still exposed elsewhere on the insert, is covered by the plateau 62 in the region of the corner portion 34. The sloped side 76 ascends to the top 64 of the plateau 62. The height of the plateau 62 is above the cutting edge 20 and this feature, coupled with the expanded plateau 62, permits the insert to be double-sided and therefore invertible. The angles A, B and D are similar to those same angles discussed earlier.

Figure 9:
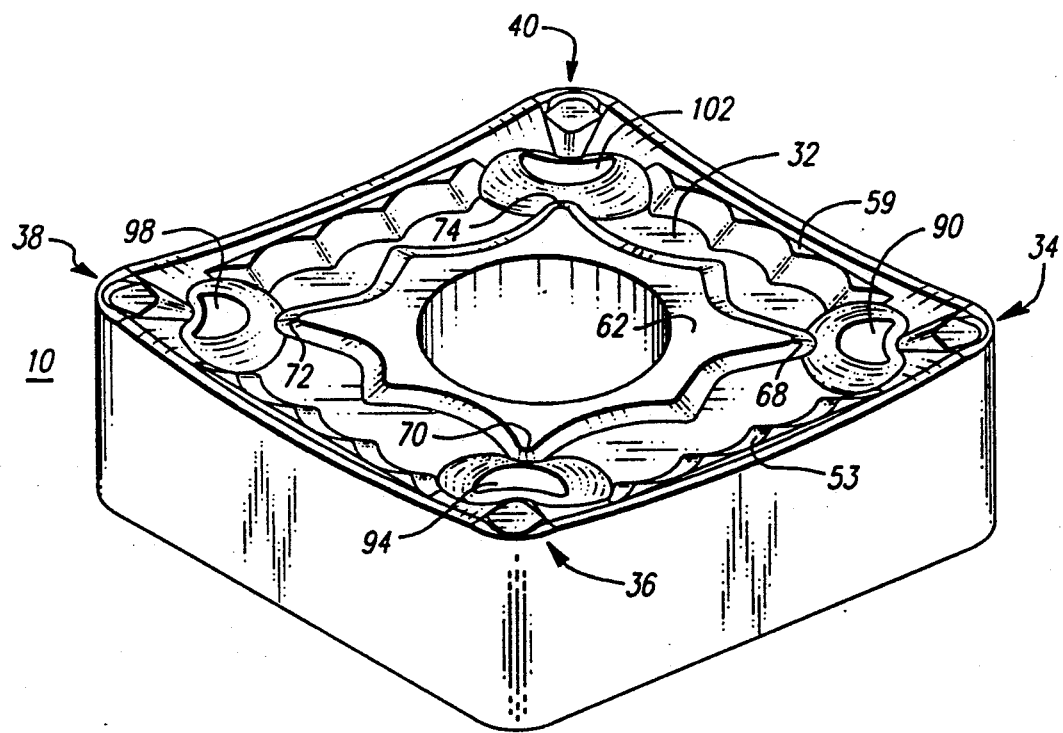
FIG. 9 is an isometric view of an insert showing an alternative embodiment of the invention similar to that embodiment illustrated in FIGS. 1-6 with the addition of protrusions in each corner.
Figure 10:
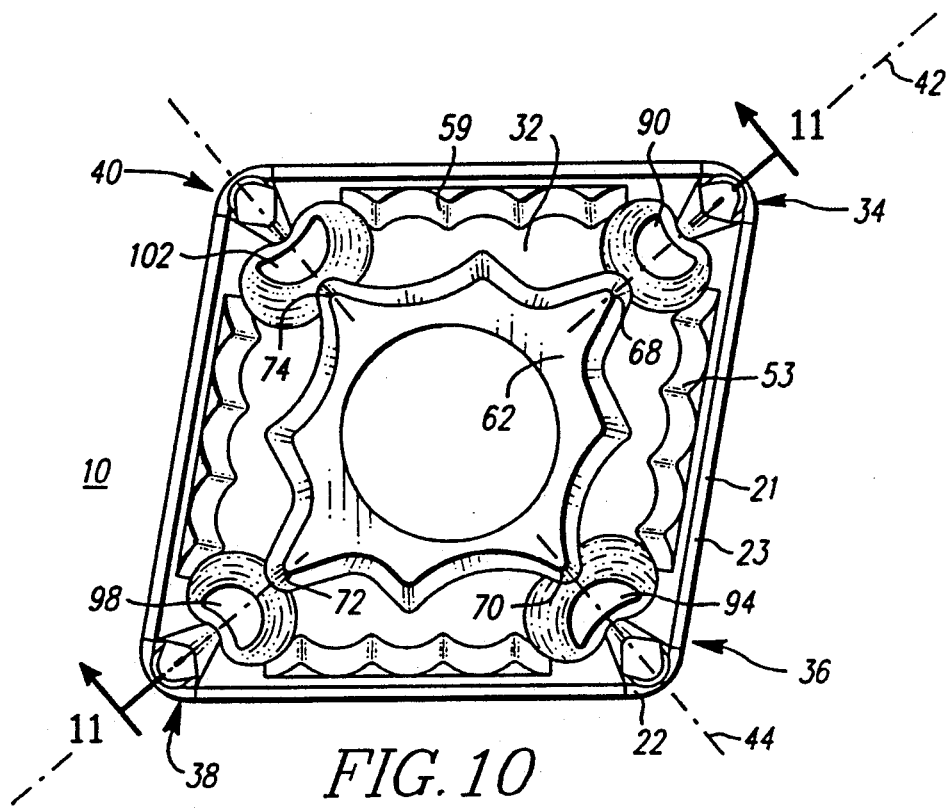
FIG. 10 is a top view of the alternative embodiment shown in FIG. 9.
Figure 11:
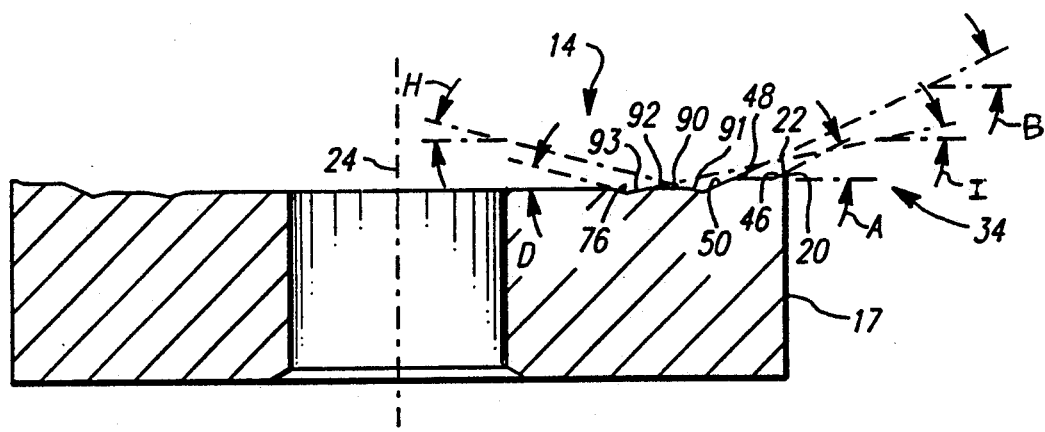
FIG. 11 is a cross-sectional view of a portion of the insert viewed along arrows "11—11" in FIG. 10.

FIGS. 9-11 illustrate an alternative embodiment of the invention whereby protuberances are included within an embodiment similar to that embodiment shown in FIGS. 1-6. FIG. 9 shows protuberances 90, 94, 98 and 102 disposed upon the floor 32 of the insert 10 between corner portions 34, 36, 38 and 40, and plateau 62 corner curves 68, 70, 72 and 74 respectively. Once again, for simplicity and clarity, corner portion 34 with protuberance 90 and corner curve 68 will be discussed with the understanding that these details will be similar to those of protuberances 94, 98, and 102. It should be noted that protuberance 90 is also in contact with projection 53 and 59. This contact is not a necessary feature of the invention.

FIG. 10 shows a top view of the cutting insert shown in FIG. 9. Item numbers for previously discussed portions of the cutting insert in FIG. 9 are included in FIG. 10. The corner portions 34, 36, 38 and 40 may again be disposed about bisector lines 42 and 44.

FIG. 11 shows a cross-sectional view of the insert shown in FIG. 10 along arrows "11—11" or bisector line 42. Just as before, peripheral wall 17 intersects with the top surface 14 of the insert 10 to form the cutting edge 20. The cutting edge land area 21, comprised of corner portion land areas 22 and side portion land areas 23, extends inwardly from the cutting edge 20 toward the center 24 of the insert (FIGS. 10 and 11). Upper descending wall 46 extends from the corner portion land area 22 to a recessed planar area 48 at an elevation below the corner portion land area 22. A lower descending wall 50 extends from the recessed planar area 48. However, protuberance 90 has been disposed upon the floor in the corner portion 34 and, as such, the lower descending wall 50 now extends to the protuberance ascending surface 91 of the protuberance 90. The surface 91 ascends inwardly toward the center 24 of the insert and upwardly to the protuberance top 92. The top of the protuberance 92 is at an elevation below the recessed planar area 48. The protuberance descending surface 93 extends toward the center 24 of the insert from the protuberance top 92. The descending surface 93 intersects the sloped side 76 of the plateau 62. Note that the elevation of the plateau 62 may be higher or lower than the protuberance top 92. The angles A, B and D are similar to those values discussed previously The angle H which the protuberance ascending surface 91 forms with the reference plane 45 is approximately 15 degrees. The angle I, which the protuberance descending surface 93 forms with the reference plane 45 is approximately 25 degrees. It should be noted that a floor 32 (FIG. 9) exists on the insert surface for all of those regions except where the protuberances 90, 94, 98 and 102 exist.

Figure 12:
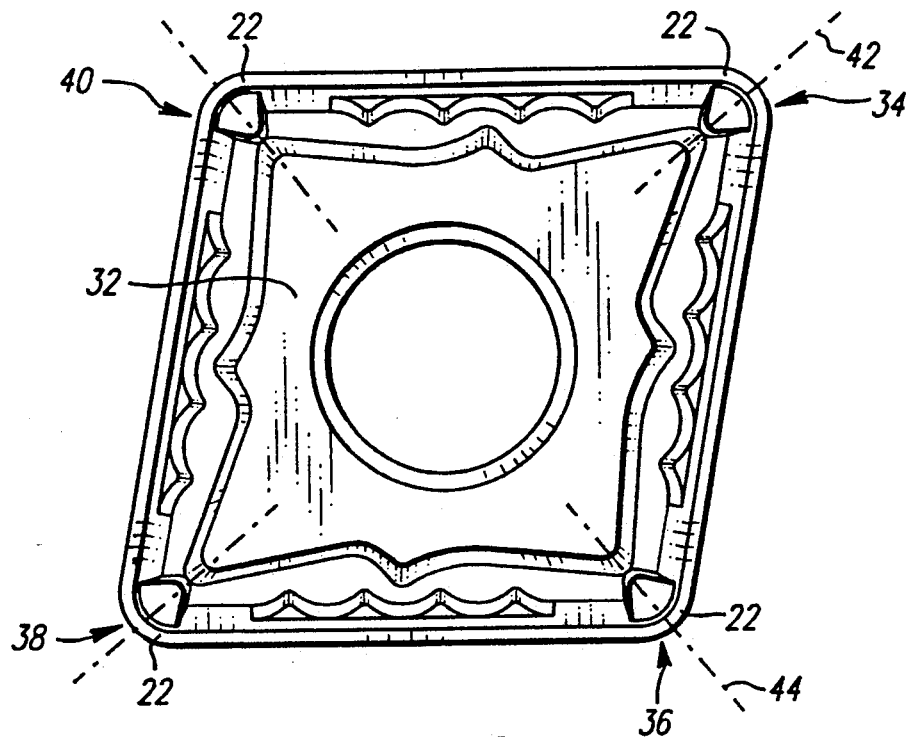
FIG. 12 is a top view of an alternate embodiment of the invention showing the corner portion land area in each corner portion region to be of uniform width.

FIG. 12 illustrates the top view of a cutting insert 10 having corner portions 34, 36, 38 and 40 which are not recessed within the corner portion land area 22 in that respective corner. In such a manner, the corner portion land area 22 in each of the corner portions 34, 36, 38 and 40 has a uniform width. FIG. 12 also illustrates an example of a planar floor 32. While not shown with a side view, the angle C comparable to that shown in FIG. 5 for the floor shown in FIG. 12 would be 0 degrees. While FIG. 12 shows other features it is presented only to illustrate the positioning of each corner portion in order to provide a corner portion land area 22 having a uniform width across each corner portion and a planar floor 32. These features may be implemented in any of the embodiments of this invention. For reference bisector lines 42 and 44 are shown.

Figure 13:
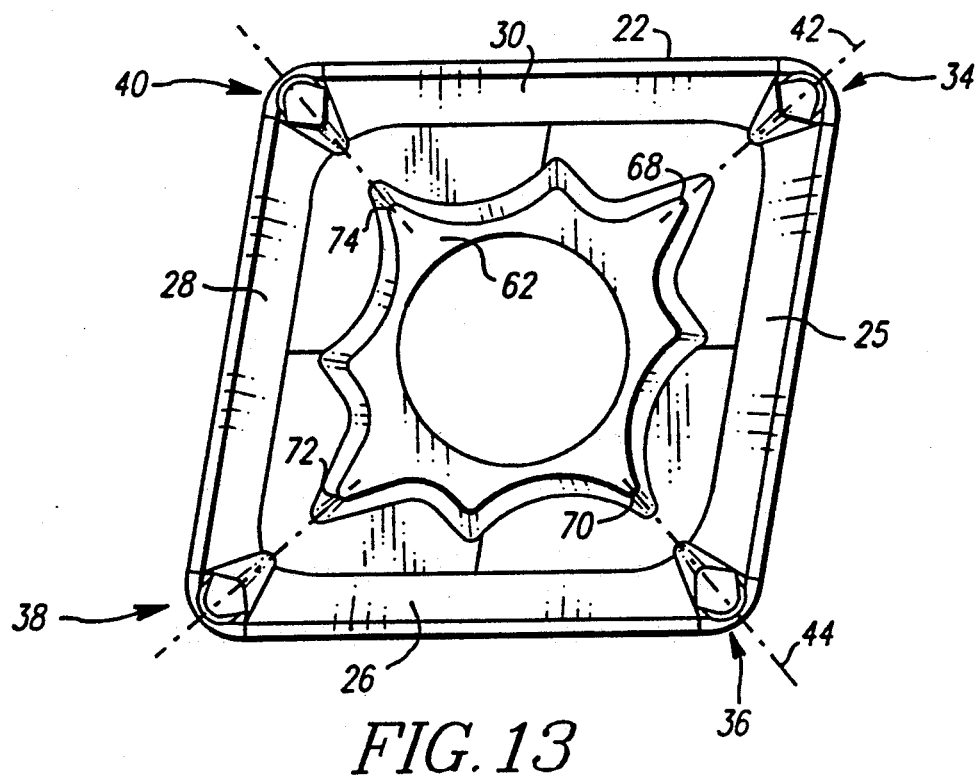
FIG. 13 is a top view of an alternative embodiment of the invention showing an insert without projections having wave-like elements.

While each of the figures so far has illustrated projections having wave-like elements, such as projection 52 having wave-like elements 53 in FIG. 1, another embodiment for this invention involves the insert design without such projections. FIG. 13 illustrates essentially the detail of FIG. 1 with the projections 53, 55, 57 and 59 removed. As such, sloping wall portions 25, 26, 28 and 30 are each continuous surfaces uninterrupted by the projections. Just as before, although not shown in FIG. 13, the plateau 62 may be expanded such that the corner curves 68, 70, 72 and 74 extend to intersect with the respective corner portions 34, 36, 38 and 40 disposed about bisector lines 42 and 44.

Figure 14:
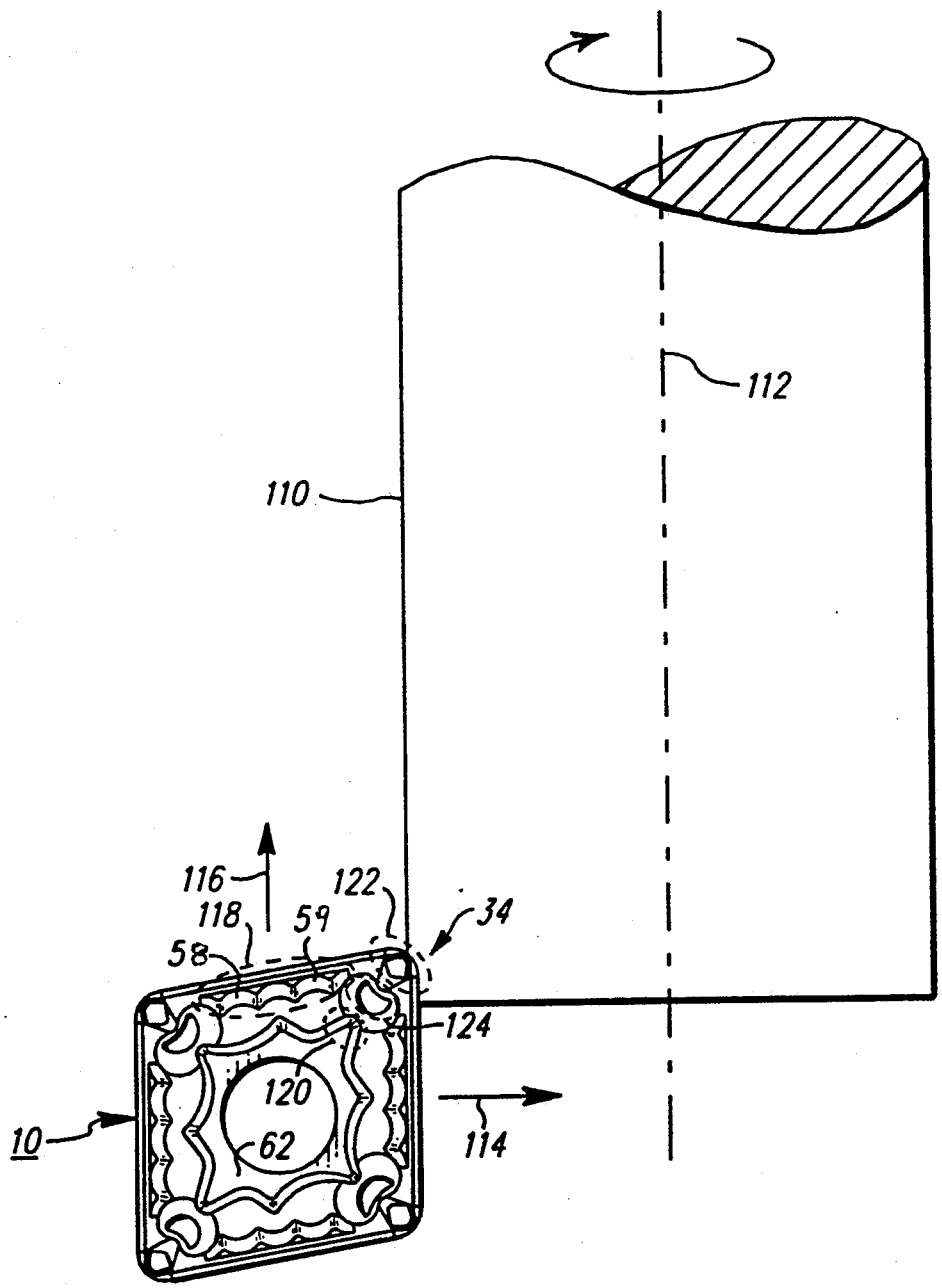
FIG. 14 is a top view identical to that shown in FIG. 10 with the addition of a workpiece to illustrate one position in which the cutting insert may be utilized.

To generally illustrate the utility of different portions of the cutting insert for chip control, FIG. 14 shows the cutting insert 10 of FIG. 10 positioned with a workpiece 110 rotating about an axis 112 at a certain angular velocity. It should be noted that the size of the cutting insert 10 is intentionally exaggerated relative to the workpiece 110 to show features. The cutting insert 10 is positioned in the direction of arrow 114 to a depth relative to the workpiece edge. This position relative to the workpiece 110 is known as the depth of cut. The cutting insert 10 is advanced into the workpiece 110 in the direction of arrow 116 at a rate known as the feed rate.

For a heavy depth of cut and a light feed rate, region 118 will be engaged with the workpiece 110 and the projection 58 and wave-like elements 59 will contact the workpiece 110. For a heavy depth of cut and a heavy feed rate, region 120 will be engaged and the plateau 62 will be contacted. For a light depth of cut and a medium feed rate, region 122 will be engaged and the corner region 34 will be contacted. Finally for a moderate depth of cut and a moderate feed rate, region 124 will be engaged and protuberance 90 will be contacted.

It should be noted that chip control is also a function of speed determined by, in this instance, the angular velocity of the workpiece 110. Chip control is enhanced by higher speeds however greater stress is placed upon the cutting insert and as such certain insert materials are not acceptable. Specifically, when the cutting insert is made of KYON ® 4000, higher speeds are possible and acceptable chip control is possible without the use of protuberance 90 or any of the other protuberances. However when the cutting insert is made of titanium carbide or other cemented carbides, the slower speeds require the addition of the protuberances, such as protuberance 90, for the desired level of chip control.

What has been described is a cutting insert having a geometric configuration permitting the insert to be used under a variety of cutting parameters and providing chip control under each of these parameters. Modifications may be made within the scope of the appended claims.

What is claimed is:

1. An indexable cutting insert comprising a polygonal body of wear resistant material, said body including top and bottom surfaces and therebetween a peripheral wall with sides and rounded corners, the intersection of said peripheral wall and said top surface forming a cutting edge, said top surface comprising:
   a) a land area joining said cutting edge and extending inwardly toward a center of said body, said land area comprised of corner portion land areas and side portion land areas;
   b) a floor between said land area and said center of said body disposed at a lower elevation than said land area,
   c) sloping wall portions inclined downwardly and inwardly from said land area to said floor;
   d) corner portions disposed at respective corners of said body, each corner portion positioned about a bisector line which bisects the angle formed by the intersection at said corner portion of a line extended from the cutting edge along each adjacent side, each corner portion embedded in and protruding from the respective corner portion land area such that the respective corner portion land area extends inwardly to a lesser amount than adjacent side portion land areas, wherein a reference plane is defined by a plane intersecting the corner portion land areas along the cutting edge and wherein each corner portion comprises;
      i) a recessed planar area disposed in and protruding from said sloping wall portions at an elevation between said corner portion land area and said floor,
      ii) an upper descending wall from said corner portion land area to said recessed planar area,
      iii) a convex lower descending wall about said respective bisector line from said recessed planar area to said floor; and
   a plateau disposed upon said floor, said plateau spaced apart from said sloping wall portions and said plateau having sloped sides ascending from said floor.

2. The cutting insert according to claim 1 wherein the plateau has a top surface with a periphery defining corner curves, with each corner curve defining the shape of the adjacent sloped side, each corner curve being positioned near each corner portion and about a respective bisector line such that a convex ascending surface to the top of the plateau is formed and aligned with each respective corner portion.

3. The cutting insert according to claim 2 wherein the periphery of said plateau further comprises curves defining convex ascending surfaces at locations between respective corner curves.

4. The cutting insert according to claim 1 further comprising a projection having at least one wave-like element disposed upon a sloping wall portion between adjacent pairs of corner portions, said at least one element comprising a planar upper surface located at an elevation below said land area and above said floor extending toward the center from said sloping wall portion and also comprising a downwardly and inwardly sloped surface extending from said planar surface to said floor, said at least one element being spaced from said corner portions to define a chip curling zone between said corner portions and said projection.

5. The cutting insert according to claim 1 further comprising a protuberance associated with each corner portion, each protuberance extending from said floor and positioned about a respective diagonal bisection line at a location between said plateau and said sloping wall portions.

6. The cutting insert according to claim 5 wherein each protuberance contacts a portion of said plateau sloped side, said sloping wall portion and corner portion lower descending wall.

7. The cutting insert according to claim 1 further comprising a projection having at least one wave-like element disposed upon said sloping wall portion between adjacent pairs of corner portions, said at least one element comprising a planar upper surface located at an elevation below said land area and above said floor extending toward the center from said sloping wall portion and a downwardly and inwardly sloped surface extending from said planar surface, said at least one element being spaced from said corner portions to define a chip curling zone between said corner portions and said projection and further comprising a protuberance associated with each corner portion, each protuberance extending from said floor and positioned about a respective diagonal bisection line at a location between said plateau and said sloping wall portions.

8. An indexable cutting insert comprising a polygonal body of wear resistant material, said body including top and bottom surfaces and therebetween a peripheral wall with sides and rounded corners, the intersection of said peripheral wall and said top surface forming a cutting edge, said top surface comprising:
  a) a land area joining said cutting edge and extending inwardly toward a center of said body, said land area comprised of corner portion land areas and side portion land areas;
  b) a floor between said land area and said center of said body disposed at a lower elevation than said land area,
  c) sloping wall portions inclined downwardly and inwardly from said land area to said floor;
  d) corner portions disposed at respective corners of said body, each corner portion positioned about a bisector line which bisects the angle formed by the intersection at said corner portion of a line extended from the cutting edge along each adjacent side, each corner portion spaced apart from the respective corner portion land area and extending from adjacent sloping wall portions such that the corner portion land area is of a uniform width, wherein a reference plane is defined by a plane intersecting the corner portion land areas along the cutting edge and wherein each corner portion comprises;
    i) a recessed planar area disposed in and protruding from said sloping wall portions at an elevation between said corner portion land area and said floor,
    ii) an upper descending wall from said corner portion land area to said recessed planar area,
    iii) a convex lower descending wall about said respective bisector line from said recessed planar area to said floor;
  e) a plateau disposed upon said floor, said plateau spaced apart from said sloping wall portions and said plateau having sloped sides ascending from said floor; and
  f) a projection having a plurality of adjacent wave-like elements disposed upon a sloping wall portion between adjacent pairs of corner portions, each of said elements comprising a planar upper surface located at an elevation below said land area and above said floor extending toward the center from said sloping wall portion and also comprising a downwardly and inwardly sloped surface extending from said planar surface to said floor, said elements being spaced from said corner portions to define a chip curling zones between said corner portions and said projection and between respective adjacent elements.

9. The cutting insert according to claim 8 wherein the plateau has a top surface with a periphery defining corner curves, with each corner curve defining the shape of the adjacent sloped side, each corner curve being positioned near each corner portion and about a respective bisector line such that a convex ascending surface to the top of the plateau is formed and aligned with each respective corner portion.

10. The cutting insert according to claim 9 wherein the periphery of said plateau further comprises curves defining convex ascending surfaces at locations between respective corner curves.

11. The cutting insert according to claim 8 further comprising a protuberance associated with each corner portion, each protuberance extending from said floor and positioned about a respective diagonal bisection line at a location between said plateau and said sloping wall portions.

12. The cutting insert according to claim 8 further comprises a projection having at least one wave-like element disposed upon said sloping wall portion between adjacent pairs of corner portions, said at least one element comprising a planar upper surface located at an elevation below said land area and above said floor extending toward the center from said sloping wall portion and a downwardly and inwardly sloped surface extending from said planar surface, said at least one element being spaced from said corner portions to define a chip curling zone between said corner portions and said projection and further comprising a protuberance associated with each corner portion, each protuberance extending from said floor and positioned about a respective diagonal bisection line at a location between said plateau and said sloping wall portions.

13. An indexable cutting insert comprising a polygonal body of wear resistant material, said body including top and bottom surfaces and therebetween a peripheral wall with sides and rounded corners, the intersection of said peripheral wall and said top surface forming a cutting edge, said top surface comprising:
  a) a land area joining said cutting edge and extending inwardly toward a center of said body, said land area comprised of corner portion land areas and side portion land areas;
  b) a floor between said land area and center of said body disposed at a lower elevation than said land area,
  c) sloping wall portions inclined downwardly and inwardly from said land area to said floor; and
  d) corner portions disposed at respective corners of said body positioned about a bisector line which bisects the angle formed by the intersection at said corner portion of a line extended from the cutting edge along each adjacent side, wherein a reference plane is defined by a plane intersecting the corner portion land areas along the cutting edge; and
  e) a plateau disposed upon said floor, said plateau spaced apart from said sloping wall portions, having sloped sides ascending from said floor and extending toward and contacting said corner portions and;
  f) a projection having a plurality of adjacent wave-like elements disposed upon a sloping wall portion between adjacent pairs of corner portions, each of said elements comprising a planar upper surface located at an elevation below said land area and above said floor extending toward the center from said sloping wall portion and also comprising a downwardly and inwardly sloped surface extending from said planar surface to said floor, said elements being spaced from said corner portions to define a chip curling zones between said corner portions and said projection and between respective adjacent elements.

14. The cutting insert according to claim 13 wherein the plateau has a top surface with a periphery defining corner curves, with each corner curve defining the shape of the adjacent sloped side, each corner curve being positioned near each corner portion and about a respective bisector line such that a convex ascending surface to the top of the plateau is formed and aligned with the respective corner portion.

15. The cutting insert according to claim 14 wherein the periphery of said plateau further comprises curves defining convex ascending surfaces at locations between respective corner curves.

16. The cutting insert according to claim 14 wherein said corner portions protrude from the adjacent land area, each corner portion comprising;
   i) a recessed planar area disposed in and protruding from said sloping wall portions at an elevation between said land area and said floor,
   ii) an upper descending wall from said land area to said recessed planar area,
   iii) a lower descending wall from said recessed planar area to said floor.

17. The cutting insert according to claim 13 wherein the plateau has a top surface with a periphery which comprises corner curves, said corner curves defining the shape of the adjacent sloped side, each corner curve being positioned near each corner portion and bisected by a respective bisector line such that a convex ascending surface to the top of the plateau is formed and aligned with each respective corner portion.

18. The cutting insert according to claim 17 wherein the periphery of said plateau further comprises curves defining convex ascending surfaces at locations between respective corner curves.

19. The cutting insert according to claim 17 wherein said corner portions protrude from the adjacent land area, each corner portion comprising;
   i) a recessed planar area disposed in and protruding from said sloping wall portions at an elevation between said land area and said floor,
   ii) an upper descending wall from said land area to said recessed planar area,
   iii) a lower descending wall from said recessed planar area to said floor.

20. An indexable cutting insert comprising a polygonal body of wear resistant material, said body including top and bottom surfaces and therebetween a peripheral wall with sides and rounded corners, the intersection of said peripheral wall and said top surface forming a cutting edge, said top surface comprising:
   a) a land area joining said cutting edge and extending inwardly toward a center of said body, said land area comprised of corner portion land areas and side portion land areas;
   b) a floor between said land area and center of said body disposed at a lower elevation than said land area,
   c) sloping wall portions inclined downwardly and inwardly from said land area to said floor;
   d) corner portions disposed at respective corners of said body and positioned about a bisector line which bisects the angle formed by the intersection at said corner portion of a line extended from the cutting edge along each adjacent side, each corner portion spaced apart from the respective corner portion land area and extending from adjacent sloping wall portions such that the corner portion land area is of a uniform width, wherein a reference plane is defined by a plane intersecting the corner portion land areas along the cutting edge and wherein each corner portion comprises:
      i) a recessed planar area disposed in and protruding from said sloping wall portions at an elevation between said corner portion land area and said floor,
      ii) an upper descending wall from said corner portion land area to said recessed planar area,
      iii) a lower descending wall from said recessed planar area to said floor;
   e) a plateau disposed upon said floor, said plateau spaced apart from said sloping wall portions and said plateau having sloped sides ascending from said floor; and
   f) a protuberance associated with each corner portion, each protuberance extending from said floor and positioned about a respective diagonal bisection line at a location between said plateau and said sloping wall portions and wherein each protuberance contacts a portion of said plateau sloped side, said sloping wall portion and corner portion lower descending wall.

* * * * *